Patented Aug. 18, 1931

1,819,879

UNITED STATES PATENT OFFICE

HENRY V. DUNHAM, OF BAINBRIDGE, NEW YORK, ASSIGNOR, BY MESNE ASSIGNMENTS, TO THE CASEIN MANUFACTURING COMPANY OF AMERICA, INC., OF NEW YORK, N. Y., A CORPORATION OF DELAWARE

TREATMENT OF CASEIN

No Drawing.   Application filed April 2, 1929.   Serial No. 352,053.

This invention has for its object the treatment of certain types of casein in such a manner that the physical properties of the casein are substantially altered and so that the casein so treated may be used (after being dissolved in a casein solvent) for sizing purposes in the art of coating paper and the like, whereas the casein of some varieties would be unsatisfactory for such purpose.

It is greatly to the advantage of small creameries to produce from skim milk, casein which is known in the trade as "cooked casein" instead of making the "pressed casein" which is ordinarily made by producers controlling large quantities of milk. When milk is made into pressed casein the casein must be quickly dried, otherwise it decomposes to such an extent that even when it is dried it has a bad odor, it loses considerably in adhesive strength and in a partly decomposed condition it is extremely difficult to dry; whereas cooked casein melts together during the process of making, into a solid tough dough and keeps in this condition for several weeks even in hot weather, thus allowing small producers to utilize their skim milk without a relatively large investment for plant equipment such as presses, grinders, drying equipment and the like. When cooked casein is made it is only necessary for the creamery to have holding vats for the milk while the milk is being treated with acid and cooked.

Unfortunately the physical properties of cooked casein are quite different from the properties of pressed casein. A vat of milk is precipitated in the usual well known manner by warming the milk to 120° F. and adding about a quart of hydrochloric or sulphuric acid to 1,000 pounds of the skim milk. The casein precipitates and settles to the bottom of the vat. The clear acidulated whey can then be drawn off and the casein remains in the bottom of the vat in a rather soft, granular form. If this casein after the whey has been drawn off, has been divided into two lots and one lot is washed with water, pressed and dried, this product is known as "pressed casein".

If the other portion of casein is covered with water and the water heated to about 180° or 190° Fahr. and the casein stirred and mixed into this hot water the casein gradually becomes sticky and stringy and finally joins together or agglomerates into a solid mass. While it is still in this condition the wash water is drawn off and the solid cheesy mass is put into barrels and when the product cools is one solid tough cheese. This is called "cooked casein". This cooked casein is then shipped to a central drying plant where special heavy duty shredding machines, grinding machines and the like are used to satisfactorily tear apart this tough casein into small particles, after which it is dried.

The "cooked casein" and the "pressed casein" may have about the same solubility as regards the making of a solution by means of water and alkalies such as borax, sodium carbonate, ammonia, and the like, but the viscosity of the two caseins when dissolved under the same conditions (i. e. same amount and kind of alkali, same amount of water, same temperature, same agitation, etc.) are extremely different at a given temperature.

The terms "pressed casein" and "cooked casein" are hereinafter used (as in the casein industry) to cover these two varieties of casein. In order to more clearly point out this difference, I give herewith the following experiments.

*Experiment 1.*—80 grams of dried pressed casein, ground so that the material will all pass through a 24 mesh screen, is mixed with 20 grams of borax and 400 cc. of cold water. The mixture is stirred and heated to 160° F. The heat is then turned off and the stirring continued for 15 or 20 minutes or until the casein is completely dissolved. The solution is then cooled to 140° F. and a portion of this solution tested for viscosity in a Stormer viscosimeter. The reading of the viscosimeter at 140° F., shows 308 R. P. M. When the casein solution is allowed to cool still more to a temperature of 100° F., the reading shows 25 R. P. M. on the viscosimeter.

*Experiment 2.*—The solution made from 80 grams of the dried cooked casein, ground and treated in every way exactly as in Experiment 1, shows a reading on the viscosimeter at 140° of 15 R. P. M. and when the solution is allowed to cool to 100° F. it is so very viscous that it will not record at all on the viscosimeter.

When caseins of the two types mentioned above, cooked and pressed, are used for example in the coating of paper it has been found that whereas the pressed casein having a good flow as indicated by the viscosimeter reading, is used in conjunction with the mineral bases ordinarily used in paper coating and the coating applied in the usual manner to paper, that this coating will flow out sufficiently before it dries on the paper to eliminate streaked effects due to the brushes making marks on the coating as it is being applied to the paper but with the cooked casein, the heavy, thick viscous character of the solution is sufficient to keep the paper coating mixture from flowing out quickly enough before it dries on the paper so that the paper will be found to be streaked and when the coated sheet is held up to the light the brush marks may be plainly seen with the result that the paper is not satisfactory for printing and lithographic purposes.

By my novel process I am able (at only slight expense) to so treat the cooked casein as to change its physical properties and make it practically as good (as regards paper coating) as is the pressed casein. The small creameries are thus able to produce casein which can be utilized in high grade paper coating. My invention consists in treating the cooked casein, preferably after it has been dried and ground, with a small amount of hydrofluoric or hydrofluosilicic acid.

The present application is in part a continuation of matter shown and described in my copending application 607,221, filed December 15, 1922, in which application I have enumerated several acids including hydroflouric. Since filing the above mentioned application I have found that on caseins of the type described in the present application, hydrofluoric acid and hydrofluosilicic acid are very much superior to any of the other acids with which I have experimented, and the present application is accordingly restricted to the use of these acids, hereinafter referred to as a "fluorine-containing mineral acid".

*Example 1.*—Still referring to the cooked casein described above, my preferred method of procedure is to treat this dry ground cooked casein by placing the casein in an ordinary spiral mixer and while it is being rapidly agitated, to slowly add about 2% by weight of 35% strength hydrofluoric acid or about 2% of 35% strength hydrofluosilicic acid. That is to say, to every 100 pounds of the dry 24 mesh cooked casein, I add 2 pounds of either of the above acids. I then continue mixing in the spiral mixer for about 5 minutes when the action is complete. The dry casein wholly absorbs this small amount of liquid to produce a dry-appearing product. The casein is removed and does not need any further drying or treatment in any way. It may be bagged immediately and shipped to the paper coating plant where it may be dissolved and used in the same manner as a good quality of pressed casein. 2% of 35% HF is equivalent to 0.7% of actual HF.

The cooked casein treated as described, with the hydrofluoric or hydrofluosilicic acid and dissolved as in Experiment 1, gives a viscosity at 140° F. of 284 R. P. M. and at 100° F., 28 R. P. M.

By actual large commercial tests I have demonstrated that this casein has practically as good a flow, as good spreading qualities when used in the paper coating industry as the pressed casein and is satisfactory in every way for this purpose.

My observations indicate that a casein of prime quality for paper coating purposes should have a viscosity when dissolved and tested on a Stormer viscosimeter under the directions given in Experiment 1, of not less than 250 R. P. M., thus reducing to the minimum the tendency of the finished coating to show brush marks on the paper.

*Example 2.*—It is of course possible and within the scope of this invention to add the acid to the wet undried casein which is thereafter dried. That is to say, after the casein is ready to be spread on the drying trays (and while containing say 50 to 60% water) it may have added to it, the proper amount (e. g. about 2% based on the dry weight of actual casein) of these acids and then the casein dried. In this example, if the wet casein contains 50% water, for each 100 pounds of the wet casein I would preferably employ 1 pound of commercial hydrofluoric acid or 1 pound of commercial hydrofluosilicic acid (of about 35% strength). Approximately the same results will be obtained but it is more costly to treat casein in this manner than it is to treat it after it is dried and ground.

I do not wish to limit the amount of acid to be used to the examples given in this specification as it is obvious that it would be possible to use somewhat more acid or somewhat less acid and secure useful results. From about 1% up to 4% or even 6% of the acids above referred to may be used. 2% has been found to give very satisfactory results. 1% lowers the viscosity characteristic of the cooked casein to a marked degree, which might be sufficient for rendering a particular casein usable for certain purposes.

Increasing the amount of acid beyond 2% does not seem to very greatly improve the results over 2% and obviously when the casein is subsequently dissolved, more alkali would be required, if more acid is used in the treating operation.

*Example 3.*—It is also possible and sometimes desirable, to dilute the acid with more or less water before adding the acid to the dry casein in order to get better penetration of the acid into the casein so that I do not wish to limit this invention to the use of undiluted commercial acid but I have found that if I treat a casein by using two pounds of hydrofluoric or hydrofluosilicic acid (of about 35%) first mixed in 8 pounds of water (forming a 7% solution of the actual acid) to 100 pounds of casein, then it is necessary to re-dry the casein after the acid-water mixture is added (otherwise the product would not keep, without becoming moldy or fermenting) whereas when I add the undiluted acid to the casein, no re-drying of the resulting mixture is necessary, and the product will keep (at least for a long time) without becoming moldy.

If the diluted acid is added to casein which is to be dissolved in alkali within a day or two, drying is not necessary but the drying of the acidulated casein seems to assist the lowering of the viscosity.

Another variety of casein which has come into prominence during the last few years is the variety which may be called "sour-whey-cooked casein". An example of the preparation of this casein would be as follows. A quantity of old acid whey, containing naturally formed lactic acid and containing the lactic acid bacillus, is put into a tank. Then the milk is added to this, and the material is slowly heated until it reaches a point where it has curdled. The heating is further continued up to about 145° F., when the steam is turned off from the cooking vat and the whey is drained off, the curd is then sometimes slightly pressed by putting the curd on a suspended rack with a one-hundred pound weight on it and allowed to remain in this condition for a few hours when it is then put into barrels and shipped to a central drying plant. In other cases the casein is removed from the curding vat and washed in hot water allowing it to join together sufficiently so that after it has drained it is put into barrels without any pressing but this product, whichever way it is made, is not ordinarily manipulated as previously described in this application as regards "pressed casein".

This material has generally been produced by small producers, and the production of this casein possesses some advantages, in that it is not necessary to purchase mineral acids for precipitating the casein from the milk, and the whey which is produced, although containing a substantial amount of lactic acid, can be fed to pigs and the like. No extensive apparatus is required, and the product is usually shipped from the small producers to a central drying plant for being dried and ground. This variety of casein yields very well to the treatment as described in the present case, say with 2% of either of the above acids of the strength stated, and has been shown by repeated commercial tests which I have made. This casein can be treated exactly as in Example 2 and Example 3 given above, but Example 3 seems to give better results, on this variety of casein.

As an example I treated a carload of this casein exactly as described in Example 3, and sold it to a paper coating mill where it was used for coating paper and reported to be equal in every respect to the best Argentine casein.

I am aware that heretofore sodium fluoride has sometimes been used as an ingredient of casein solutions. For the purpose of showing whether the sodium fluoride produced when the acid-treated casein is dissolved in alkali is responsible for the reduction in viscosity, I made some comparative experiments and showed that the addition of an amount of sodium fluoride, chemically equivalent to 2% of hydrofluoric acid, at the time of dissolving cooked casein in alkali solution, increased the R. P. M. reading of the viscosimeter somewhat but not anything like as much as the increase produced by the treatment of the same casein (i. e. casein taken out of the same batch) with hydrofluoric acid as in Example 1 and subsequently dissolving in alkali. It is my opinion, based on many laboratory and commercial tests, that there is some action of the hydrofluoric acid or hydrofluosilicic acid on the casein itself.

Obviously I do not have present during the treatment of the casein with the acids, a large excess of alkali over the chemical equivalent of the amount of acid employed.

Another factor in favor of the present process (viz., the use of hydrofluoric acid or hydrofluosilicic acid) over sodium fluoride, resides in the fact that the addition of these acids does not raise the ash content of the treated casein. Ash determinations are frequently made to determine whether or not the casein has been "adulterated."

In the appended claims the term "a cooked casein" is employed to cover generically the two kinds of cooked casein above referred to, namely that which is ordinarily known as "cooked casein" and that referred to as "sour-whey-cooked casein."

The expression a "fluorine-containing mineral acid" as used in the appended claims is intended to cover hydrofluoric acid and hydrofluosilicic acid.

While I have referred above in detail to very greatly improving the viscosity characteristic of the two varieties of cooked casein specifically described, I do not intend to imply thereby that all of the properties of the said caseins are substantially altered, to make a modified cooked casein which will be in all respects identical with pressed casein, for all purposes for which caseins are used.

However for the paper coating industry the treated cooked caseins are fully as good as a good grade of pressed casein as is shown by the numerous repeat orders received from the customers and the letters received from the customers (in the paper coating industry).

I claim:—

1. The process of reducing the viscosity characteristics of cooked casein which comprises treating a cooked casein, prior to treatment with an alkaline solvent for casein, with a small percentage of a fluorine-containing mineral acid.

2. The process of reducing the viscosity characteristics of cooked casein, which comprises treating a cooked casein, prior to treatment with an alkaline solvent for casein, with a quantity of a fluorine-containing mineral acid equivalent to about 1 to 3% of the acid of 35% strength, based on the dry weight of the casein.

3. The process of reducing the viscosity characteristics of cooked casein which comprises treating a cooked casein, prior to treatment with an alkaline solvent for casein, with a quantity of a fluorine-containing mineral acid equivalent to about 1 to 3% of the acid of 35% strength, based on the dry weight of the casein, such acid being added in the from of a solution of from about 7% to about 35% strength.

4. A cooked casein having the characteristic of forming with ordinary alkaline casein solvents solutions of low viscosity, which is sufficiently dry to be stable, containing a small percentage of a fluorine-containing mineral acid.

5. A cooked casein having the characteristic of forming with ordinary alkaline casein solvents solutions of low viscosity, which is sufficiently dry to be stable, containing an amount of a fluorine-containing mineral acid equivalent to about 1 to 3% of the acid of commercial strength.

6. A cooked casein having the characteristic of forming with ordinary alkaline casein solvents solutions of low viscosity, which is sufficiently dry to be stable, containing an amount of a fluorine-containing mineral acid equivalent to about 2% of the acid of 35% strength.

7. A cooked casein modified by a fluorine containing mineral acid, of which one part when dissolved in 5 parts of a 5% solution of borax will give a solution testing at least 250 R. P. M. on a Stormer viscosimeter, at 140° F.

8. The process of reducing the viscosity characteristics of cooked casein which comprises treating a cooked casein, prior to treatment with an alkaline solvent for casein, with a quantity of a fluorine-containing mineral acid equivalent to about 2% of the acid of 35% strength, based on the dry weight of the casein.

9. A cooked casein having the characteristic of forming with ordinary alkaline casein solvents solutions of low viscosity, which is sufficiently dry to be stable, containing a small percentage of a fluorine-containing mineral acid and having substantially no greater ash content than has cooked casein of ordinary commercial grade.

10. The process of reducing the viscosity characteristics of cooked casein which comprises treating a substantially dry cooked casein, prior to treatment with an alkaline solvent for casein, with a small percentage of a fluorine-containing mineral acid.

11. The process of reducing the viscosity characteristics of cooked casein which comprises treating a wet cooked casein, prior to treatment with an alkaline solvent for casein, with a small percentage of a fluorine-containing mineral acid, and thereafter drying the product.

12. A cooked casein having the characteristic of forming with ordinary alkaline casein solvents solutions of low viscosity, which is sufficiently dry to be stable, containing an amount of a fluorine-containing mineral acid equivalent to about 1 to 3% of the acid of commercial strength and which has substantially no greater ash content than has cooked casein of ordinary grade.

13. A cooked casein, modified by a fluorine containing mineral acid, of which one part when dissolved in 5 parts of a 5% solution of borax will give a solution testing at least 250 R. P. M. on a Stormer viscosimeter, at 140° F., and which has substantially no greater ash content than has cooked casein of ordinary grade.

In testimony whereof I affix my signature.

HENRY V. DUNHAM.